US009537701B2

(12) United States Patent
Deng et al.

(10) Patent No.: US 9,537,701 B2
(45) Date of Patent: Jan. 3, 2017

(54) JOINT ESTIMATION AND COMPENSATION METHOD OF RF IMPERFECTIONS IN LTE UPLINK SYSTEM

(71) Applicant: YUAN ZE UNIVERSITY, Taoyuan County (TW)

(72) Inventors: Juinn-Horng Deng, Taoyuan County (TW); Hung-Yang Hsieh, Taipei (TW); Jeng-Kuang Hwang, Taoyuan County (TW); Yi-Hsin Lin, Taichung (TW); Sheng-Yang Huang, Tainan (TW); Kuang-Min Lin, Taoyuan County (TW)

(73) Assignee: Yuan Ze University, Zhongli (TW)

( * ) Notice: Subject to any disclaimer, the term of this patent is extended or adjusted under 35 U.S.C. 154(b) by 0 days.

(21) Appl. No.: 14/972,886

(22) Filed: Dec. 17, 2015

(65) Prior Publication Data

US 2016/0285667 A1 Sep. 29, 2016

(30) Foreign Application Priority Data

Mar. 27, 2015 (TW) .............................. 104110066 A

(51) Int. Cl.
*H04L 27/28* (2006.01)
*H04L 27/26* (2006.01)

(52) U.S. Cl.
CPC ....... *H04L 27/2666* (2013.01); *H04L 27/2607* (2013.01); *H04L 27/2657* (2013.01)

(58) Field of Classification Search
CPC ............... H04L 27/266; H04L 27/2666; H04L 27/2607; H04L 27/2657

(Continued)

(56) References Cited

U.S. PATENT DOCUMENTS 7,676,009 B2 * 3/2010 Yen .................. H04L 25/03057
375/232
8,971,465 B2 * 3/2015 Varanese ............... H04L 1/0001
375/261

(Continued)

FOREIGN PATENT DOCUMENTS

CN WO 2013040999 A1 * 3/2013 ......... H04L 27/2657

OTHER PUBLICATIONS

A. Kiayani, L. Anttila, M. Valkama, "Mobile Transmitters I/Q Imbalances in LTE Uplink: Analysis and Digital Mitigation," in IEEE International Conference on Communication systems (ICCS), Singapore, Nov. 2012.

(Continued)

*Primary Examiner* — Daniel Washburn
*Assistant Examiner* — Berhanu Tadese
(74) *Attorney, Agent, or Firm* — Rosenberg, Klein & Lee

(57) ABSTRACT

A joint estimation and compensation method of RF imperfections in a LIE (Long Term Evolution) uplink system comprises steps: establishing a joint signal model with RF imperfections; according to the joint signal model, undertaking estimation and compensation of CFO, DC offset, multipath channel, IQ imbalance and shaping filter imbalance of a received signal; and using a frequency equalizer to equalize said received signal and determine modulation data. For reducing computational complexity, the present invention further converts the received signal from a time domain to a frequency domain to undertake frequency domain compensation. The present invention can indeed solve the problems of IQ imbalance, filter imbalance, DC offset, multipath channel and CFO and effectively estimate and compensate RF imperfections in the LTE uplink system.

20 Claims, 8 Drawing Sheets

(58) Field of Classification Search
USPC .......................................................... 375/260
See application file for complete search history.

(56) References Cited

U.S. PATENT DOCUMENTS

| | | | | |
|---|---|---|---|---|
| 9,049,676 | B2* | 6/2015 | Haas | H04W 52/42 |
| 9,312,929 | B2* | 4/2016 | Forenza | H04B 7/024 |
| 2006/0203901 | A1* | 9/2006 | Tan | H03D 3/009 |
| | | | | 375/233 |
| 2007/0127582 | A1* | 6/2007 | Lee | H04L 25/0234 |
| | | | | 375/260 |
| 2008/0013654 | A1* | 1/2008 | Rick | H03G 3/3068 |
| | | | | 375/345 |
| 2009/0067517 | A1* | 3/2009 | Hung | H04L 5/0007 |
| | | | | 375/260 |
| 2009/0180466 | A1* | 7/2009 | Soul | H03J 7/04 |
| | | | | 370/350 |
| 2009/0310721 | A1* | 12/2009 | Redfern | H04L 25/061 |
| | | | | 375/344 |
| 2010/0272208 | A1* | 10/2010 | Feigin | H04B 1/28 |
| | | | | 375/268 |
| 2010/0316163 | A1* | 12/2010 | Forenza | H04B 7/024 |
| | | | | 375/296 |
| 2011/0299639 | A1* | 12/2011 | Maleysson | H03J 7/065 |
| | | | | 375/344 |
| 2012/0163499 | A1* | 6/2012 | Kim | H04L 27/3854 |
| | | | | 375/298 |
| 2012/0213095 | A1* | 8/2012 | Krishnamurthy | H04L 5/001 |
| | | | | 370/252 |
| 2012/0275472 | A1* | 11/2012 | Hao | H04B 1/7105 |
| | | | | 370/479 |
| 2013/0121246 | A1* | 5/2013 | Guey | H04W 56/001 |
| | | | | 370/328 |
| 2013/0266100 | A1* | 10/2013 | Gomadam | H04L 5/0023 |
| | | | | 375/346 |
| 2015/0098440 | A1* | 4/2015 | Yang | H04J 11/0056 |
| | | | | 370/330 |

OTHER PUBLICATIONS

A. Kiayani, L. Anttila, Y. Xou, and M. Valkama, "Hybrid Time/Frequency Domain Compensator for RF Impairments in OFDM Systems," in Proceedings of the 22nd IEEE International Symposium on Personal, Indoor and Mobile Radio Communications (PIMRC '11), Toronto, Canada, Sep. 2011.

C.J. Hsu, R. Cheng and W.H. Sheen, "Joint Least Squares Estimation of Frequency, DC Offset, I-Q Imbalance, and Channel in MIMO Receivers," IEEE Transactions on Vehicular Technology, vol. 58, No. 5, Jun. 2009.

C.J. Hsu and W.H. Sheen, "Joint Estimation and Compensation of Transmitter and Receiver Radio Impairments in MIMO-OFDM Receivers," in Int. Sym. on Personal, Indoor and Mobile Radio Communications (PIMRC '09), 2009.

Gye-Tae Gil, Il-Hyun-Sohn, Jin-Kyu Park, Yong H. Lee, "Joint ML Estimation of Carrier Frequency, Channel, I/Q Mismatch, and DC Offset in Communication Receivers," IEEE Transactions on Vehicular Technology, pp. 338-349, vol. 54, Issue: 1, Jan. 2005.

C.J. Hsu and W.H. Sheen, "Joint Calibration of Transmitter and Receiver Impairments in Direct-Conversion Radio Architecture," IEEE Trans. Wireless Commun., vol. 11, No. 2, pp. 832-841, 2012.

* cited by examiner

| Spectrum | VSA | ⊗ | LTE | ⊗ | | | | | |
|---|---|---|---|---|---|---|---|---|---|
| Freq | | | 1.85 GHz | | MEAS sETUP | 1 TX x 1 RX | Ext. Att | | 0 dB |
| Mode | UL FDD, 6 RB (1.4 MHz), Normal (CP) | | | | Sync State | OK | Capture Time | | 20.1 ms |
| | TRG : FREE.RUN | RF | | | Frame | 5 Of 6 (1) | | | |
| | | | Result Summary | | | | | | |
| Frame Resule 5/6 | Min | | Mean | Limit | | Max | Limit | Unit | |
| EVM PuSCH QPSK | | | | | | | 18.50 | % | |
| EVM PuSCH 16QAM | | | 10.08 | | | | 13.50 | % | |
| EVM DMRS PUSCH QPSK | | | | 18.50 | | | | % | |
| EVM DMRS PUSCH 16QAM | | | 9.77 | 13.50 | | | | % | |
| EVM PuCCH | | | | 18.50 | | | | % | |
| EVM DMRS PuCCH | | | | 18.50 | | | | % | |
| Results for Selection | Subframe(s) | ALL | Slot(s) | ALL | | Frame Result 5/6 | | | |
| EVM All | 9.54 | | 10.06 | | | 10.58 | | % | |
| EVM Phys. Channel | 9.49 | | 10.11 | | | 11.08 | | % | |
| EVM Phys. Signal | 9.19 | | 9.77 | | | 10.62 | | % | |
| Frequency Error | 9987.11 | | 10000.76 | | * | 10014.02 | 185.00 | Hz | |
| Sampling Error | | | | | | | | ppm | |
| IQ Offset | -18.36 | | -18.06 | | | 1.17.70 | | db | |
| IQ Gain Imbalance | 0.88 | | 0.94 | | | 1.00 | | db | |
| IQ Quadrature Error | -10.55 | | -10.31 | | | -9.78 | | o | |
| Power | -17.04 | | -16.91 | | | -16.76 | | dbm | |
| Crest Factor | 5.54 | | 6.27 | | | 7.23 | | db | |

Fig.4(a)

JOINT ESTIMATION AND COMPENSATION METHOD OF RF IMPERFECTIONS IN LTE UPLINK SYSTEM

This application claims priority for Taiwan patent application no. 104110066 filed on Mar. 27, 2015, the content of which is incorporated by reference in its entirely.

BACKGROUND OF THE INVENTION

Field of the Invention

The present invention relates to an estimation and compensation technology for overcoming RF imperfections, particularly to a joint estimation and compensation method of RF imperfections, such as IQ imbalance, shaping filter imbalance, DC offset, multipath channel and carrier offset, in an uplink system.

Description of the Related Art

Succeeding to HSPA (High Speed Packet Access), LTE (Long Term Evolution) is a wireless access standard proposed by 3GPP (3rd Generation Partnership Project) to achieve further higher transmission efficiency. ITU (International Telecommunication Union) has formally defined LTE as 4G in 2010. LTE can enhance network transmission capacity and speed and support higher requirement of wireless communication.

According to the LTE specification proposed by 3GPP, an uplink system uses SC-FDMA (Single Carrier Frequency Division Multiple Access) signals, and a downlink system uses OFDMA (Orthogonal Frequency Division Multiple Access) signals. The present invention is primarily involved with the technology of LTE uplink systems. Users of mobile devices often care about power consumption and price. Higher PAPR (Peak to Average Power Ratio) will cause high price and high power consumption. Therefore, the LTE standard adopts the low power consumption SC-FDMA technology for uplink systems.

In an LTE uplink system, RF impairments are likely to occur in the DAC/RF device of the transmitter or receiver, such as IQ (In-phase/Quadrature-phase) imbalance, shaping filter imbalance, and DC offset. In other words, the baseband transmitter generates complex baseband signals; the baseband signals are divided into real parts (I signals) and image parts (Q signals); the I signals and Q signals are processed by DAC and respectively multiplied by a cosine wave and a sine wave, which have an identical amplitude and an identical frequency but have a phase difference of exactly 90 degrees; then, the signals are carried by a radio frequency and transmitted. On receiving the signals, the receiver down-converts and demodulates the signals. However, mismatches are likely to occur between the oscillators respectively generating sinusoidal waves in the transmitter and the receiver, including magnitude mismatches, phase mismatches, and oscillation frequency mismatches. The magnitude mismatch is called the magnitude imbalance. While the phases lack complete orthogonality, the phenomenon is called the phase imbalance. The two imbalances are called the IQ imbalance in combination. On the other hand, the transmitter and receiver must use a shaping filter to decrease the bandwidth of signals so as to meet the demand of the system and reduce ISI (Inter-Symbol Interference). The Nyquist filter and the SRRC (Square Root Raise Cosine) filter are often used to shape the signals of the transmitter and the receiver. While the transmitter and the receiver respectively adopt different shaping filters, shaping filter imbalance may take place there between. The cheaper direct-conversion architecture is often used to reduce the cost. In such a case, a portion of the power of the local oscillator leaks to RF signals and mixes with the transmitted signals, which will cause IQ DC offset in the transmitter.

Besides, multipath propagation usually occurs in a wireless communication system because of refraction, diffraction or scattering in an indoor or outdoor environment. In such a case, the receiver will receive two or more signals from different paths in different delay time, which will cause ISI and degrade the performance. Further, while up- or down-conversion is undertaken between the transmitter and the receiver, incomplete synchronization of the oscillators will cause frequency offset. Furthermore, Doppler shift occurring in high speed movement will lead to CFO (Carrier Frequency Offset). CFO will seriously affect the SC-FDMA- or OFDMA-based system, not only interfering with wireless communication but also leading to ICI (Inter-Carrier Interference).

The signal imbalances, such as IQ imbalance, shaping filter imbalance, DC offset, multipath channel, and CFO, will lead to RF mismatch in an LTE uplink system. At present, most of the related technologies undertake estimation and compensation in the frequency domain. However, they do not apply to LTE uplink systems. So far, neither a joint estimation nor a joint compensation method has been published, not to mention a time-domain joint estimation and compensation method considering various RF attenuations.

Accordingly, the present invention proposes a joint estimation and compensation method of RF imperfection in an uplink system to overcome all the imperfections in LTE uplink systems.

SUMMARY OF THE INVENTION

The primary objective of the present invention is to provide a joint estimation and compensation method of RF imperfections in an uplink system, which undertakes joint estimation and compensation of signal imbalances in a time domain to overcome IQ imbalance, shaping filter imbalance, DC offset, multipath channel, and carrier frequency offset of LTE uplink systems, and which exempts the LTE uplink systems from the affection of the IQ mismatch generated by a direct-conversion transmitter or receiver, whereby to effectively estimate and compensate for the RF mismatch of LTE uplink systems.

Another objective of the present invention is to provide a joint estimation and compensation method of RF imperfections in an uplink system, which takes different RF attenuations into consideration simultaneously and undertakes estimation and compensation jointly in the time domain.

A further objective of the present invention is to provide a low-complexity frequency-domain compensator.

To achieve the abovementioned objectives, the present invention proposes a joint estimation and compensation method, which comprises steps: establishing a joint signal model with RF imperfections; according to the joint signal model, undertaking an initial CFO (Carrier Frequency Offset) estimation of a received signal in a time domain so as to estimate the CFO parameter and compensate the received signal; estimating DC offset, multipath channel, imbalance signals in the joint signal model of the received signal and compensating the received signal in the time domain; then determining the modulation data. In order to increase the feasibility of testing the system, the present invention further proposes a time-domain compensation method, which greatly reduces the computation of matrix conversions and multiplications, whereby the cost of developing chips is decreased and the efficiency of the system is optimized.

After the estimation of the initial transmitted signal has been acquired, whether the error vector magnitude converges is verified. If the error vector magnitude does not converge, the decision-directed symbol is used to undertake iterative CFO estimation and compensation so as to undertake further estimation and compensation of RF imperfections until the error vector magnitude converges. If the error vector magnitude converges, the gain mismatch parameter and phase mismatch parameter of the joint signal model are estimated according to the imbalance parameters.

Below, embodiments are described in detail in cooperation with the attached drawings to make easily understood the objectives, technical contents, and accomplishments of the present invention.

BRIEF DESCRIPTION OF THE DRAWINGS

FIG. 4(a) shows EVM of the performance analysis results of an R&S LTE signal analyzer;

DETAILED DESCRIPTION OF THE INVENTION

The present invention discloses a joint estimation and compensation method of RF imperfections in an uplink system to solve the problems of IQ imbalance, filter imbalance, DC offset, multipath channel and CFO (Carrier Frequency Offset) in a LTE uplink system so as to effectively estimate and compensate for RF mismatch in the LTE uplink system.

Figure 1:
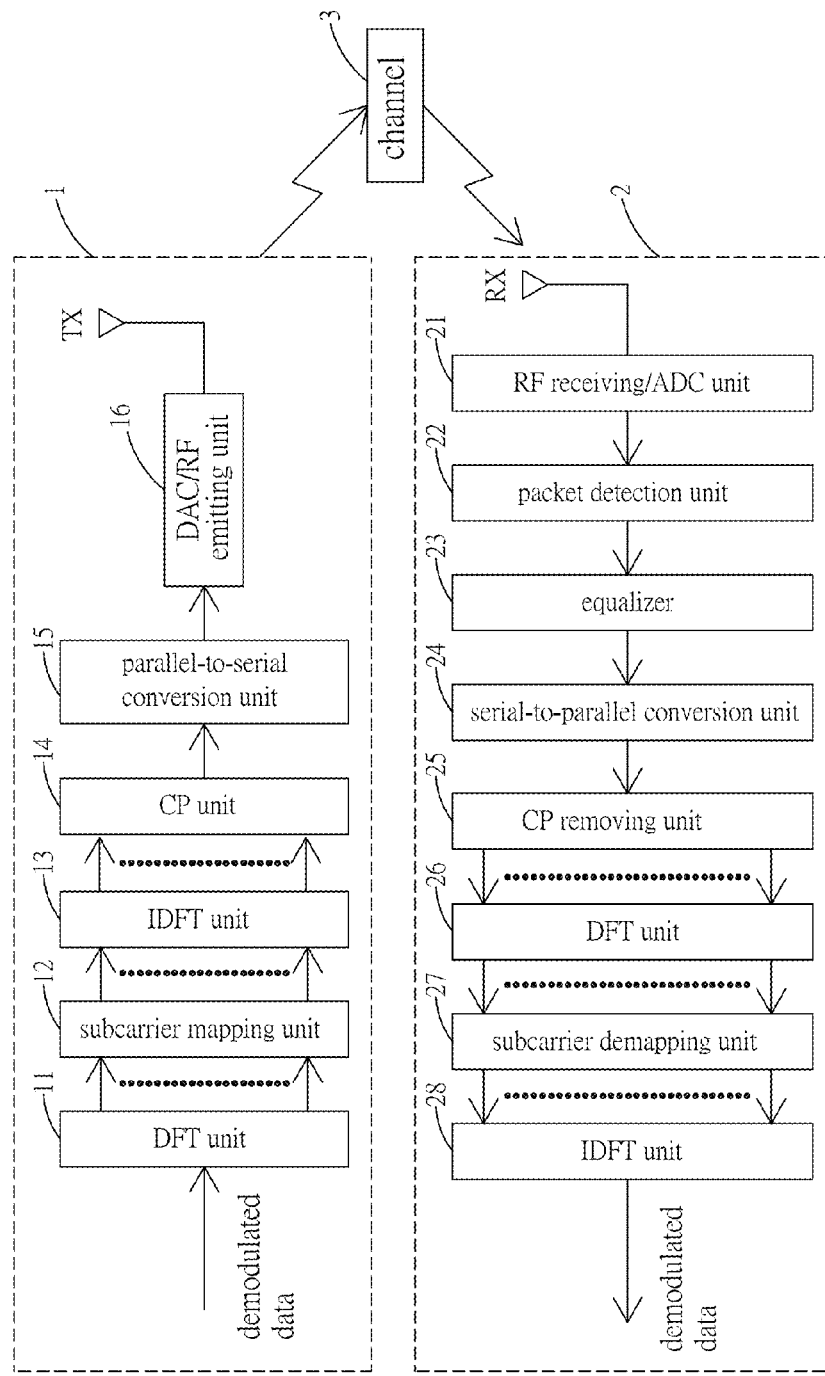
FIG. 1 is a diagram schematically showing the architecture of an uplink system used by the present invention.

Refer to FIG. 1 for the architecture of an uplink system used by the present invention. In a transmitter 1, the demodulated data passes a DFT (Discrete Fourier Transform) unit 11, a subcarrier mapping unit 12 and an IDFT (Inverse DFT) unit 13 in sequence, and has a ½ frequency offset (Δf) in the IDFT unit 13. Next, a CP (Cyclic Prefix) unit 14 adds cyclic prefixes to the signal. Next, a parallel-to-serial conversion unit 15 converts the parallel signal into a serial signal. Then, a DAC/RF emitting unit 16 converts the signal into an analog signal and transmits the analog signal. The signal is transmitted to a receiver 2 via a channel 3. In the receiver 2, the received signal passes an RF receiving/ADC unit 21, a packet detection unit 22 and an equalizer 23 in sequence. The equalizer 23 estimates and compensates for RF imperfections and removes the ½ frequency offset (Δf). Next, a serial-to-parallel conversion unit 24 converts the serial signal into a parallel signal. Next, a CP removing unit 25 removes the cyclic prefixes. Next, the signal passes a DFT unit 26, a subcarrier demapping unit 27 and an IDFT (Inverse DFT) unit 28. Then, the demodulated data is output. Between the transmitter 1 and the receiver 2, there are problems of IQ imbalances, DC offset, multipath channel, and carrier frequency offset, which will be estimated and compensated jointly in the equalizer 23.

Figure 2:
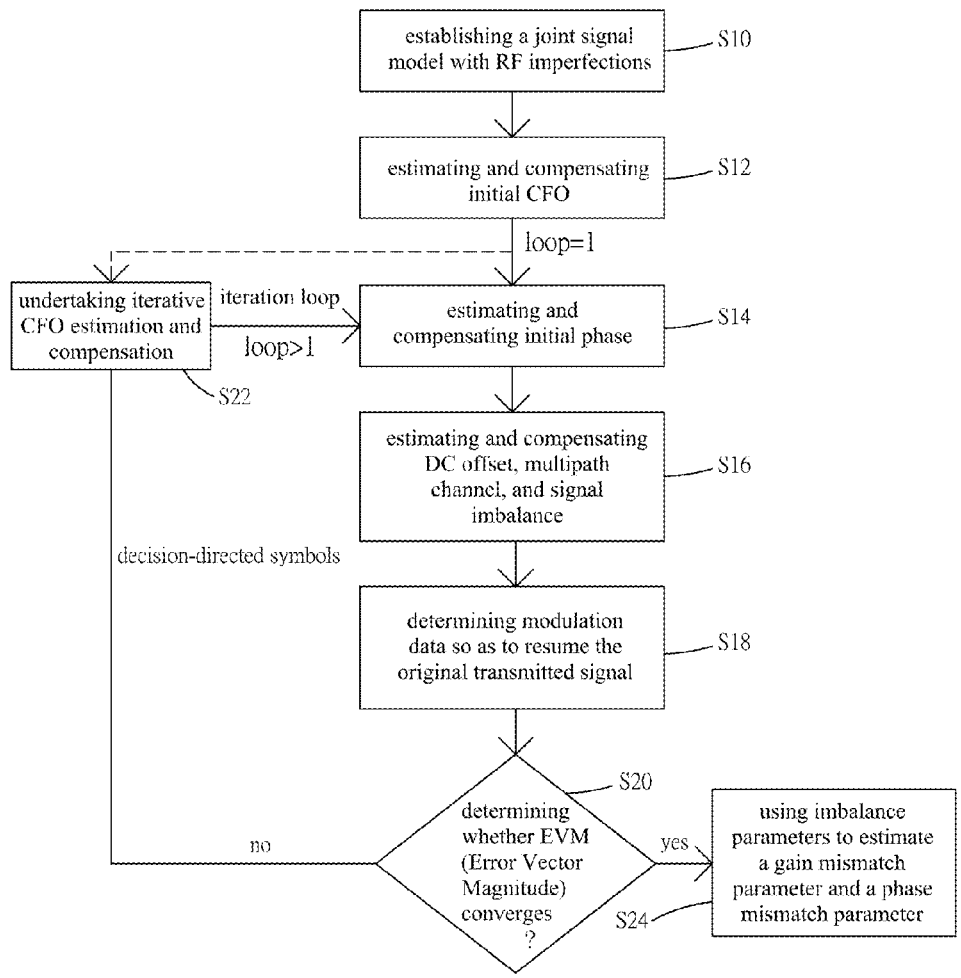
FIG. 2 shows a flowchart of a joint estimation and compensation method of RF imperfections in an uplink system according to one embodiment of the present invention.

Refer to FIG. 2 for a flowchart of a joint estimation and compensation method of RF imperfections in an uplink system according to one embodiment of the present invention. In Step S10, establish a joint signal model with RF imperfections, including CFO (Carrier Frequency Offset), DC offset, multipath channel, IQ imbalance and shaping filter imbalance. In Step S12, after the receiver 2 receives the signal, use a training sequence in a time domain to undertake an estimation of the initial CFO of the received signal according to the joint signal model so as to estimate the CFO parameters and compensate the received signal. In Step S14, after CFO have been compensated, use the training sequence to undertake an estimation and compensation of the initial phase of the received signal. In Step S16, use the training sequence in a time domain to undertake a joint estimation of the DC offset, multipath channel, and signal imbalance of the joint signal model so as to compensate for all the RF imperfection factors of the received signal, wherein the signal imbalance includes IQ imbalance and shaping filter imbalance. In Step S18, after the abovementioned estimation and compensation, determine the modulation data so as to resume the original transmitted signal. In Step S20, after the modulation data has been determined, determine whether EVM (Error Vector Magnitude) converges. If yes, the process proceeds to Step S24. If EVM does not converge, the process proceeds to Step S22. In Step S22, use decision-directed symbols to undertake iterative CFO estimation and compensation, and then return to Step S14 to undertake the abovementioned steps to make further estimation and compensation of RF imperfection factors until EVM converges. If EVM converges in Step S20, the process proceeds to Step S24. In Step S24, use imbalance parameters, including IQ imbalance parameters and filter imbalance parameters, to estimate the parameters of gain mismatch and phase mismatch in the joint signal model. The magnitude imbalance and phase imbalance of IQ imbalance can also be learned in Step S24. Thus are completely solved the problems of IQ imbalance, shaping filter imbalance, DC offset, multipath channel, and carrier frequency offset in LTE uplink systems. Further is eliminated the affection of IQ mismatch caused by a direct-conversion transceiver. Therefore, the present invention can effectively estimate and compensate for RF imperfections of LTE uplink systems.

In order to demonstrate the signal processing steps in detail and make easily understood the technical characteristics of the present invention, the method of the present invention will be described in three parts from simple to complex: 1. joint estimation and compensation of IQ imbalance and shaping filter imbalance; 2. joint estimation and compensation of IQ imbalance, shaping filter imbalance, IQ DC offset and multipath channel; 3. joint estimation and compensation of IQ imbalance and shaping filter imbalance, IQ DC offset, multipath channel and carrier frequency offset. The three parts will be described step by step in sequence to make readers fully appreciate the technical contents of the present invention.

Firstly is described a time-domain joint estimation and compensation architecture of IQ imbalance and shaping filter imbalance, which can eliminate the affection of IQ mismatch caused by a direct-conversion transceiver. Suppose perfect synchronization exists in a joint signal model with IQ imbalance and shaping filter imbalance. After synchronization and down-sampling, the received signal y can be expressed by Equation 1.1:

$$y = h_1 \otimes \tilde{u} + h_2 \otimes \tilde{u}^* \qquad 1.1$$

wherein the length of y is L, and wherein the coefficients $h_1$ and $h_2$ is involved with RF imperfections, including IQ imbalance and shaping filter imbalance, and can be expressed by Equation 1.2:

$$\begin{cases} h_1 = \frac{1}{2}(h_{C,I} + h_{C,Q} g_T e^{j\phi_T}) \\ h_2 = \frac{1}{2}(h_{C,I} - h_{C,Q} g_T e^{j\phi_T}) \end{cases} \qquad 1.2$$

Wherein $h_{C,I}$ and $h_{C,Q}$ are respectively the real-part shaping filter imbalance parameter and the imaginary-part shaping filter imbalance parameter, and can be expressed by Equation 1.3:

$$\begin{cases} h_{C,I} = \text{Re}\{h_{RX}\} \otimes \text{Re}\{h_{TX}\} = h_{RX,I} \otimes h_{TX,I} \\ h_{C,Q} = \text{Im}\{h_{RX}\} \otimes \text{Im}\{h_{TX}\} = h_{RX,Q} \otimes h_{TX,Q} \end{cases} \qquad 1.3$$

Wherein $\text{Re}\{\cdot\}$ and $\text{Im}\{\cdot\}$ respectively denote the real part and the imaginary part.

A training sequence can be used to estimate the joint signal with IQ imbalance and shaping filter imbalance. A DMRS (demodulation reference signal) sequence is used as the training sequence and substituted into Equation 1.1. Thus is obtained Equation 1.4:

$$\begin{aligned} y &= h_1 \otimes \tilde{c} + h_2 \otimes \tilde{c}^* \\ &= \tilde{C} \tilde{h}_1 + \tilde{C}^* \tilde{h}_2 \\ &= \tilde{\tilde{C}} \begin{bmatrix} \tilde{h}_1 \\ \tilde{h}_2 \end{bmatrix} \end{aligned} \qquad 1.4$$

wherein the parameters are respectively defined by Equations 1.5-1.9:

$$\tilde{h}_1 = \text{diag}\{e_0, e_{-1}, \ldots, e_{-L+1}\} h_1 \qquad 1.5$$

$$\tilde{h}_2 = \text{diag}\{e_0^*, e_{-1}^*, \ldots, e_{-L+1}^*\} h_2 \qquad 1.6$$

$$e_{-n} = e^{j\pi(-n)/N}, n = 0, 1, \ldots, L-1 \qquad 1.7$$

$$h_1 = [h_{1,-L/2}, h_{1,-L/2+1}, \ldots, h_{1,L/2-1}, h_{1,L/2}]^T \qquad 1.8$$

$$h_2 = [h_{2,-L/2}, h_{2,-L/2+1}, \ldots, h_{2,L/2-1}, h_{2,L/2}]^T \qquad 1.9$$

wherein $\tilde{\tilde{C}} = [\tilde{C} \tilde{C}^*]$ is a N by (L+1) matrix C which involves a circular convolution matrix of a training sequence $\tilde{c}$ with $\Delta f = \frac{1}{2}$ offset. $\tilde{c} = [\tilde{c}(0) \tilde{c}(1) \ldots \tilde{c}(N-1)]$ is a Chu sequence with a length of N and $\Delta f = \frac{1}{2}$, which is expressed by Equation 1.10.

$$\tilde{C} = E \begin{bmatrix} c(0) & c(N-1) & \ldots & c(1) \\ c(1) & c(0) & \ldots & c(2) \\ \vdots & \vdots & \ddots & \vdots \\ c(N-1) & c(N-2) & \ldots & c(0) \end{bmatrix}_{N \times L} \qquad 1.10$$

wherein $E = \text{diag}\{e_0, e_1, \ldots, e_{N-1}\}$ is a diagonal matrix representing $\Delta f = \frac{1}{2}$ offset.

According to Equation 1.4, the parameters of IQ imbalance and shaping filter imbalance can be estimated with a pseudo inverse matrix expressed by Equation 1.11:

$$\begin{bmatrix} \hat{\tilde{h}}_1 \\ \hat{\tilde{h}}_2 \end{bmatrix} = \tilde{\tilde{C}}^\dagger y = \left( \tilde{\tilde{C}}^H \tilde{\tilde{C}} \right)^{-1} \tilde{\tilde{C}}^H y \qquad 1.11$$

Assumed that $\hat{\tilde{h}}_1$ and $\hat{\tilde{h}}_2$, and joint parameters of IQ imbalance and shaping filter imbalance can be estimated perfectly. The time-domain compensation of the received signal as expressed by Equation 1.1 is expressed by Equation 1.12:

$$\begin{aligned} y &= h_1 \otimes \tilde{u} + h_2 \otimes \tilde{u}^* \\ &= E \tilde{H}_1 u + E^* \tilde{H}_2 u^* \\ &= \tilde{\tilde{H}}_1 u + \tilde{\tilde{H}}_2 u^* \\ &= \left( \tilde{\tilde{H}}_{1,I} + j \tilde{\tilde{H}}_{1,Q} \right)(u_I + j u_Q) + \left( \tilde{\tilde{H}}_{2,I} + j \tilde{\tilde{H}}_{2,Q} \right)(u_I - j u_Q) \end{aligned} \qquad 1.12$$

wherein both $\tilde{\tilde{H}}_1$ and $\tilde{\tilde{H}}_2$ involve imbalance coefficients, which has $\Delta f = \frac{1}{2}$ offset, of joint estimation of Q imbalance and shaping filter imbalance are expressed by Equations 1.13-1.16.

$$\tilde{\tilde{H}}_1 = E \tilde{H}_1 \qquad 1.13$$

$$= E \begin{bmatrix} \tilde{h}_{1,-L/2} & 0 & \ldots & \tilde{h}_{1,-L/2+1} \\ \tilde{h}_{1,-L/2+1} & \tilde{h}_{1,-L/2} & \ldots & \vdots \\ \vdots & \tilde{h}_{1,-L/2+1} & \ldots & \tilde{h}_{1,L/2} \\ \tilde{h}_{1,L/2} & \vdots & \ldots & 0 \\ 0 & \tilde{h}_{1,L/2} & \ldots & \vdots \\ \vdots & 0 & \ddots & 0 \\ 0 & 0 & \ldots & \tilde{h}_{1,-L/2} \end{bmatrix}$$

$$\tilde{\tilde{H}}_2 = E \tilde{H}_2 \qquad 1.14$$

$$= E \begin{bmatrix} \tilde{h}_{2,-L/2} & 0 & \ldots & \tilde{h}_{2,-L/2+1} \\ \tilde{h}_{2,-L/2+1} & \tilde{h}_{2,-L/2} & \ldots & \vdots \\ \vdots & \tilde{h}_{2,-L/2+1} & \ldots & \tilde{h}_{2,L/2} \\ \tilde{h}_{2,L/2} & \vdots & \ldots & 0 \\ 0 & \tilde{h}_{2,L/2} & \ldots & \vdots \\ \vdots & 0 & \ddots & 0 \\ 0 & 0 & \ldots & \tilde{h}_{2,-L/2} \end{bmatrix}$$

wherein $$\tilde{h}_1 = \begin{bmatrix} h_{1,-L/2} \cdot e_0 \\ h_{1,-L/2+1} \cdot e_{-1} \\ \vdots \\ h_{1,L/2} \cdot e_{-L+1} \end{bmatrix} \qquad 1.15$$

$$\tilde{h}_2 = \begin{bmatrix} h_{2,-L/2} \cdot e_0^* \\ h_{2,-L/2+1} \cdot e_{-1}^* \\ \vdots \\ h_{2,L/2} \cdot e_{-L+1}^* \end{bmatrix} \quad 1.16$$

The real part and the imaginary part can be cascaded in Equation 1.12. Thus, the received signal matrix can be acquired with Equation 1.17:

$$\begin{bmatrix} y_I \\ y_Q \end{bmatrix} = \underbrace{\begin{bmatrix} \tilde{H}_{1,I} + \tilde{H}_{2,I} & \tilde{H}_{2,Q} - \tilde{H}_{1,Q} \\ \tilde{H}_{1,Q} + \tilde{H}_{2,Q} & \tilde{H}_{1,I} - \tilde{H}_{2,I} \end{bmatrix}}_{H} \begin{bmatrix} u_I \\ u_Q \end{bmatrix} \quad 1.17$$

It is learned from Equation 1.17: H is an estimated signal imbalance matrix including IQ imbalance and shaping filter imbalance. $y = y_I + j y_Q$ represents the received signal with RF effect. $u = u_I + j u_Q$ is the SC-FDMA transmitted signal for the uplink system. The received signal whose IQ imbalance and shaping filter imbalance has been compensated can be expressed by Equation 1.18:

$$\begin{bmatrix} \hat{u}_I \\ \hat{u}_Q \end{bmatrix} = \hat{H}^{-1} \begin{bmatrix} y_I \\ y_Q \end{bmatrix} \quad 1.18$$

In order to reduce the computational complexity of the receiver, a low complexity frequency domain receiver is designed by the following steps. According to Equation 1.12, the time-domain received signal can be expressed by Equation 1.19:

$$y = h_1 \otimes \tilde{u} + h_2 \otimes \tilde{u}^* \quad 1.19$$
$$= E \tilde{H}_1 u + E^* \tilde{H}_2 u^*$$

Firstly, a known matrix $E^*$ can be used to compensate for $\Delta f = \frac{1}{2}$ offset as shown in Equation 1.20:

$$\tilde{y} = E^* y \quad 1.20$$
$$= \tilde{H}_1 u + (E^*)^2 \tilde{H}_2 u^*$$

wherein $u = [u(0)u(N-1) \ldots u(1)]^T$ is the received signal vector in the time domain, which needs equalization.

Next, the received signal can be expressed by Equation 1.21 in a frequency domain:

$$\tilde{y}_f = F\tilde{y} \quad 1.21$$
$$= F F^H \tilde{\Lambda}_1 F u + F(E^*)^2 F^H \tilde{\Lambda}_2 A B F u^*$$
$$= \tilde{\Lambda}_1 u_f + \tilde{\Lambda}_2 \bar{u}_f^*$$

Wherein F is an FFT matrix, and the other parameters in Equation 1.21 are respectively defined by Equations 1.22-1.28:

$$\tilde{H}_1 = F^H \tilde{\Lambda}_1 F \quad 1.22$$

$$\tilde{H}_2 = F^H \tilde{\Lambda}_2 F \quad 1.23$$
$$= F^H \tilde{\Lambda}_2 A B F$$

$$\tilde{\Lambda}_2 = F(E^*)^2 F^H \tilde{\Lambda}_2 A \quad 1.24$$

$$\bar{u}_f^* = B F u^* \quad 1.25$$
$$= B u_f^*$$
$$= [u_f^*(N-1) \; u_f^*(N-2) \; \ldots \; u_f^*(0)]^T$$

$$A = \begin{bmatrix} 0 & 0 & 0 & \ldots & 1 \\ 1 & 0 & 0 & \ldots & 0 \\ 0 & 1 & 0 & \ldots & 0 \\ \vdots & \vdots & \vdots & \ddots & \vdots \\ 0 & 0 & 0 & \ldots & 0 \end{bmatrix} \quad 1.26$$

$$B = \begin{bmatrix} 0 & 1 & 0 & \ldots & 0 \\ 0 & 0 & 1 & \ldots & 0 \\ 0 & 0 & 0 & \ldots & 0 \\ \vdots & \vdots & \vdots & \ddots & \vdots \\ 1 & 0 & 0 & \ldots & 0 \end{bmatrix} \quad 1.27$$

$$AB = I \quad 1.28$$

wherein I is an identity matrix.

Via using $\hat{\tilde{H}}_1$, $\hat{\tilde{H}}_2$, $\hat{\tilde{\Lambda}}_1$, and $\hat{\tilde{\Lambda}}_2$, which are acquired in estimating $\tilde{h}_1$ and $\tilde{h}_2$, the mth and (N−1−m)th elements of $\tilde{y}_f(n)$ can be expressed by Equation 1.29:

$$\begin{bmatrix} \tilde{y}_f(n,m) \\ \tilde{y}_f^*(n, N-1-m) \end{bmatrix} = \underbrace{\begin{bmatrix} \tilde{\Lambda}_1(m,m) & \tilde{\Lambda}_2(m,m) \\ \tilde{\Lambda}_2^*(m, N-1-m) & \tilde{\Lambda}_1^*(m, N-1-m) \end{bmatrix}}_{\tilde{\Lambda}(m)} \begin{bmatrix} u_f(n,m) \\ u_f^*(n, N-1-m) \end{bmatrix}, \quad 1.29$$

$$0 \leq m \leq \frac{N}{2} - 1$$

The joint RF effect coefficient $\tilde{\Lambda}$ can be removed via multiplying the frequency-domain received signal with the inverse matrix coefficient $\tilde{\Lambda}^{-1}$ according to Equation 1.30:

$$\begin{bmatrix} \hat{u}_f(n,m) \\ \hat{u}_f^*(n, N-1-m) \end{bmatrix} = \tilde{\Lambda}^{-1}(m) \begin{bmatrix} \tilde{y}_f(n,m) \\ \tilde{y}_f^*(n, N-1-m) \end{bmatrix} \quad 1.30$$

After equalization, the original frequency-domain transmitted signal $\hat{u}_f = [\hat{u}_f(n,0)\hat{u}_f(n,1) \ldots \hat{u}_f(n,N-1)]^T$ can be acquired. Then, an IFFT ($F^H$) operator is used to acquire the original time-domain signal according to Equation 1.31, and the desired transmitted signal is transformed from the frequency domain to the time domain.

$$\hat{u} = F^H \hat{u}_f \quad 1.31$$
$$= [\hat{u}(n,0) \; \hat{u}(n,1) \; \ldots \; \hat{u}(n, N-1)]^T$$

On the other hand, the IQ-imbalance joint signal model is influenced by gain mismatch and phase mismatch, which will cause serious degradation in the system. Therefore, it is necessary to accurately calculate the gain mismatch parameter $g_T$ and the phase mismatch parameter $\phi_T$ in addition to estimating and compensating RF problems.

After $\tilde{h}_1$ and $\tilde{h}_1$ has been estimated, the effects of IQ imbalance and shaping filter imbalance are equalized, wherein the Nyquist filter is used in the transmitter and the SRRC filter is used in the receiver. Suppose the I-channel filter and Q-channel composite filter are similar ($h_{C,I}=h_{C,Q}$) In other words, identical mismatches occur in I-channel filter imbalance and Q-channel filter imbalance. For example, $h_{C,I}=h_{RX,I} \otimes h_{TX,I}$ and $h_{C,Q}=h_{RX,Q} \otimes h_{TX,Q}$. From the above discuss, it is learned: the joint IQ imbalance and shaping filter imbalance can be modeled into $$h_1 = \frac{1}{2}(h_{C,I} + h_{C,Q} g_T e^{j\phi_T}) \text{ and } h_2 = \frac{1}{2}(h_{C,I} - h_{C,Q} g_T e^{j\phi_T}).$$

Therefore, $h_1$ and $h_2$ can be used to estimate $g_T$ and $\phi_T$ with addition and subtraction technologies according to Equation 1.32 and Equation 1.33:

$$h_s = h_1 + h_2 = h_{C,I} \quad\quad 1.32$$

$$\begin{aligned} h_d &= h_1 - h_2 \\ &= h_{C,Q} g_T e^{j\phi_T} \\ &\approx h_{C,I} g_T e^{j\phi_T} \end{aligned} \quad\quad 1.33$$

According to Equation 1.32 and Equation 1.33, a correlation method uses $h_s$ and $h_d$ to obtain $g_T$ and $\phi_T$ with Equation 1.34 and Equation 1.35:

$$\begin{aligned} h_r &= h_s^H h_d \\ &= \|h_{C,I}\|^2 g_T e^{j\phi_T} \end{aligned} \quad\quad 1.34$$

$$\begin{aligned} \bar{h}_r &= \frac{h_r}{\|h_s\|^2} \\ &= g_T e^{j\phi_T} \end{aligned} \quad\quad 1.35$$

The obtained $g_T$ and $\phi_T$ are shown in Equation 1.36:

$$\begin{cases} \hat{g}_T = |\bar{h}_r| \\ \hat{\phi}_T = \tan^{-1}(\bar{h}_r) \end{cases} \quad\quad 1.36$$

Part I of the description of the method of the present invention, which involves the joint signal model with IQ imbalance and shaping filter imbalance, has been stated above. Part II, which involves a joint signal further with DC offset and multipath channel, will be described below.

In Part II, a joint estimation and compensation architecture of IQ imbalance, shaping filter imbalance, DC offset and multipath channel to eliminate the IQ mismatch caused by a direct-conversion transceiver will be described. The received signal of a joint signal model with IQ imbalance, shaping filter imbalance, DC offset and multipath channel can be expressed by Equation 2.1:

$$y = h_1 \otimes (\tilde{u}+d1) + h_2 \otimes (\tilde{u}^*+d^*1) \quad\quad 2.1$$

wherein $h_1$ and $h_2$ are joint models also involving IQ imbalance parameter and shaping filter imbalance parameter similar to those in Equation 1.2, and wherein d denotes IQ DC offset and Vector I is an N×1 vector of all ones.

However, $h_1$ and $h_2$ involve filter imbalance coefficients $h_{C,I}$ and $h_{C,Q}$, which are convoluted with multipath channel $h_{ch}$. The estimation and compensation method in Part II will be integrated with that of Part I and is expressed by Equation 2.2.

$$\begin{cases} h_{C,I} = \text{Re}\{h_{RX}\} \otimes \text{Re}\{h_{ch} \otimes h_{TX}\} \\ h_{C,Q} = \text{Im}\{h_{RX}\} \otimes \text{Im}\{h_{ch} \otimes h_{TX}\} \end{cases} \quad\quad 2.2$$

wherein $h_{ch}$ denotes multipath channel.

These problems can be estimated with a DMRS training sequence. The received signal can be represented by a convolution matrix expressed by Equation 2.3:

$$\begin{aligned} y &= h_1 \otimes \tilde{c} + h_2 \otimes \tilde{c}^* + h_1 \otimes d1 + h_2 \otimes d^*1 \\ &= \tilde{C}\tilde{h}_1 + \tilde{C}^*\tilde{h}_2 + dDh_1 + d^*Dh_2 \end{aligned} \quad\quad 2.3$$

wherein D is a circular convolution matrix of all 1 vectors, and wherein $\tilde{C}$ is a N by L+1 circular convolution matrix of the training sequence with $\Delta f = \frac{1}{2}$ offset, as shown in Equation 2.4-2.6.

$$\tilde{C} = E \begin{bmatrix} c(0) & c(N-1) & \cdots & c(1) \\ c(1) & c(0) & \cdots & c(2) \\ \vdots & \vdots & \ddots & \vdots \\ c(N-1) & c(N-2) & \cdots & c(0) \end{bmatrix}_{N \times (L+1)} \quad 2.4$$

$$\tilde{h}_1 = \text{diag}\{e_0, e_{-1}, \ldots, e_{-L}\} h_1 \quad\quad 2.5$$

$$\tilde{h}_2 = \text{diag}\{e_0^*, e_{-1}^*, \ldots, e_{-L}^*\} h_2 \quad\quad 2.6$$

In order to remove the DC offset in the frequency domain, the received signal is processed with post-FFT and expressed by Equation 2.7:

$$\begin{aligned} y_f &= Fy \\ &= F\tilde{C}\tilde{h}_1 + F\tilde{C}^*\tilde{h}_2 + dFDF^H Fh_1 + d^*FDF^H Fh_2 \end{aligned} \quad\quad 2.7$$

wherein $F^H F$ is an identity matrix, and wherein $$\begin{aligned} FDF^H &= \Lambda_{DC} \\ &= \text{diag}\{\lambda_{DC}, 0, \ldots, 0\} \end{aligned} \quad\quad 2.8$$

wherein $\Lambda_{DC}$ is a diagonal matrix with only the eigenvalue $\lambda_{11}$, and the other elements are zero. Thereby, the IQ DC offset can be removed easily.

Therefore, from Equation 2.7, the post-FFT received data can be multiplied by a T matrix (an (N−1)×N matrix) to eliminate the component of IQ DC offset according to Equation 2.9:

$$\bar{y}_f = TFy \qquad (2.9)$$
$$= F_T \tilde{C} \tilde{h}_1 + F_T \tilde{C}^* \tilde{h}_2 + dF_T DF^H F h_1 + d^* F_T DF^H F h_2$$

wherein $$F_T = TF \qquad (2.10)$$

$$F_T DF^H = T\Lambda_{DC} = O_{(N-1) \times N} \qquad (2.11)$$

$$T = [o_{(N-1) \times 1} \mid I_{(N-1) \times (N-1)}] \qquad (2.12)$$

wherein O is an $(N-1) \times N$ matrix of all zeros, o is an $(N-1) \times 1$ vector of all zeros, and I is an identity matrix. Therefore, Matrix T can be used to eliminate the component of IQ DC offset.

After IQ DC offset is removed, $\bar{y}_f$ is obtained according to Equation 2.13:

$$\bar{y}_f = F_T \tilde{C} \tilde{h}_1 + F_T \tilde{C}^* \tilde{h}_2 \qquad (2.13)$$
$$= \tilde{\tilde{C}} \begin{bmatrix} \tilde{h}_1 \\ \tilde{h}_2 \end{bmatrix}$$

wherein $\tilde{\tilde{C}} = [F_T \tilde{C} F_T \tilde{C}^*]$ is a composite training sequence matrix in the frequency domain.

Similarly to the approach to obtain Equation 1.11, a LS (Least Square) algorithm can be used to estimate $\hat{\tilde{h}}_1$ and $\hat{\tilde{h}}_2$ according to Equation 2.14.

$$\begin{bmatrix} \hat{\tilde{h}}_1 \\ \hat{\tilde{h}}_2 \end{bmatrix} = \tilde{\tilde{C}}^\dagger \bar{y}_f = \left( \tilde{\tilde{C}}^H \tilde{\tilde{C}} \right)^{-1} \tilde{\tilde{C}}^H \bar{y}_f \qquad (2.14)$$

Next, $\hat{\tilde{h}}_1$ and $\hat{\tilde{h}}_2$ are used to estimate IQ DC offset d with a feedback cancellation technique according to Equation 2.15:

$$\tilde{y} = y - \left( \tilde{C} \tilde{h}_1 + \tilde{C}^* \tilde{h}_2 \right) \qquad (2.15)$$
$$= dDh_1 + d^* Dh_2$$

wherein $h_1$ and $h_2$ can be estimated with $\hat{\tilde{h}}_1$ and $\hat{\tilde{h}}_2$. According to Equation 2.5 and Equation 2.6, $\hat{\tilde{h}}_1$ and $\hat{\tilde{h}}_2$ are multiplied by $\mathrm{diag}\{e_0^*, e_{-1}^*, \ldots, e_{-L}^*\}$ and $\mathrm{diag}\{e_0^*, e_{-1}^*, \ldots, e_{-L}^*\}$; $\hat{\tilde{h}}_1$ and $\hat{\tilde{h}}_2$ are acquired from Equation 2.14. Thus are derived $h_1$ and $h_2$, which are respectively expressed by Equation 2.16 and Equation 2.17.

$$h_1 = \mathrm{diag}\{e_0^*, e_{-1}^*, \ldots, e_{-L}^*\} \tilde{h}_1 \qquad (2.16)$$

$$h_2 = \mathrm{diag}\{e_0, e_{-1}, \ldots, e_{-L}\} \tilde{h}_2 \qquad (2.17)$$

All the elements of $\tilde{y}$ in Equation 2.15 are summed up to obtain Equation 2.18 and Equation 2.19:

$$z = \sum_{m=1}^{N} \tilde{y}(n, m) \qquad (2.18)$$
$$= d\tilde{\tilde{h}}_1 + d^* \tilde{\tilde{h}}_2$$

$$\tilde{\tilde{h}}_i = \sum_{m=1}^{N} \tilde{h}_{i,m}, \, i = 1, 2 \qquad (2.19)$$

wherein $\tilde{y}(n,m)$ is the mth element of the nth symbol of the received signal, and wherein $\tilde{h}_{i,m}$ is the mth element of $h_i$, and wherein $\tilde{\tilde{h}}_i = Dh_i$.

In order to express IQ DC offset with the real part and imaginary part, IQ DC offset is expressed by Equation 2.20 and Equation 2.21:

$$\begin{bmatrix} z_I \\ z_Q \end{bmatrix} = \underbrace{\begin{bmatrix} \tilde{\tilde{h}}_{1,I} + \tilde{\tilde{h}}_{2,I} & \tilde{\tilde{h}}_{2,Q} - \tilde{\tilde{h}}_{1,Q} \\ \tilde{\tilde{h}}_{1,Q} + \tilde{\tilde{h}}_{2,Q} & \tilde{\tilde{h}}_{1,I} - \tilde{\tilde{h}}_{2,I} \end{bmatrix}}_{\tilde{H}} \begin{bmatrix} d_I \\ d_Q \end{bmatrix} \qquad (2.20)$$

$$\begin{bmatrix} \hat{d}_I \\ \hat{d}_Q \end{bmatrix} = \tilde{H}^{-1} \begin{bmatrix} z_I \\ z_Q \end{bmatrix} \qquad (2.21)$$

wherein $z = z_I + j z_Q$, $\tilde{\tilde{h}}_i = \tilde{\tilde{h}}_{i,I} + j \tilde{\tilde{h}}_{i,Q}$, $i = 1, 2$, and $d = d_I + j d_Q$.

Further, the reconstructed IQ DC offset signal is subtracted from the received signal, and the residual signal is expressed by Equation 2.22 which is equal to Equation 1.1 in Part I.

$$\bar{y} = y - (h_1 \otimes d1 + h_2 \otimes d^* 1) \qquad (2.22)$$
$$= y - (dDh_1 + d^* Dh_2)$$
$$= h_1 \otimes \tilde{u} + h_2 \otimes \tilde{u}^*$$

Then, the estimated $\hat{\tilde{h}}_1$ and $\hat{\tilde{h}}_2$ are used to equalize the received SC-FDMA signal. As DC offset and multipath channel have been estimated and compensated in Equation 2.22, Equation 2.22 is identical to Equation 1.1. Therefore, the equalization scheme expressed by Equations 1.12-1.18 in Part I can be used to restore the original transmitted data $\hat{u}$.

The received SC-FDMA signal not only can be equalized in the time domain but also can be equalized in the frequency domain for lower computation complexity. There are only joint IQ imbalance and shaping filter imbalance remaining in Equation 2.22 after IQ DC offset has been eliminated. In other words, the remaining problem is the same as that of Equation 2.19 without IQ DC offset and can be processed with the same frequency-domain equalizer. According to Equation 2.22, Equations 1.19-1.31 can be used to acquire the original transmitted signal.

After Part I and Part II, a joint estimation and compensation architecture of IQ imbalance, shaping filter imbalance, DC offset, multipath channel, and carrier frequency offset (CFO), which can remove all the effects of IQ mismatches caused by a direct-conversion transceiver, will be described in Part III.

The received signal $\tilde{y}$, which has been expressed by Equation 2.1 is presented again herein as Equation 3.1. Equation 3.1 involves all the factors discussed above, including IQ imbalance, shaping filter imbalance, DC offset, and multipath channel. Considering the CFO effect, the received signal can be expressed as Equation 3.2 with the symbols thereof respectively defined by Equations 3.3-3.5.

$$\tilde{y} = h_1 \otimes (\tilde{u} + d1) + h_2 \otimes (\tilde{u}^* + d^*1) \qquad 3.1$$

$$y = \phi(\varepsilon)\Psi(\varepsilon)\tilde{y} \qquad 3.2$$
$$= \Psi(\varepsilon)\{\tilde{h}_1 \otimes (\tilde{u} + d1) + \tilde{h}_2 \otimes (\tilde{u}^* + d^*1)\}$$

$$\phi(\varepsilon) = e^{j(2\pi\varepsilon(N+G)n/N+\theta)} \qquad 3.3$$

$$\Psi(\varepsilon) = \text{diag}\{1, e^{j2\pi\varepsilon 1/N}, \ldots, e^{j2\pi\varepsilon(N-1)/N}\} \qquad 3.4$$

$$\tilde{h}_1 = \phi(\varepsilon)h_1 \qquad 3.5$$
$$\tilde{h}_2 = \phi(\varepsilon)h_2$$

Wherein $\theta$ is the initial phase, $\varepsilon$ the normalized CFO, such as $\varepsilon = \Delta f_{CFO} N T_s$, and wherein imbalance parameters $h_1$ and $h_2$ are multiplied by $\phi(\varepsilon)$ and the products are respectively expressed by $\tilde{h}_1$ and $\tilde{h}_2$.

Herein, the initial CFO is compensated in two parts, i.e. the initial fractional CFO and the initial integral CFO. A neighboring and identical DMRS training sequence and a correlation are used to estimate the initial fractional CFO, which is denoted by $\varepsilon_F$, according to Equation 3.6 and Equation 3.7:

$$\tilde{z} = \sum_{m=1}^{N} y^*(n(N+G) + G + m) \cdot y((n+K)(N+G) + G + m) \qquad 3.6$$
$$= \left\{\sum_{m=1}^{N} \alpha(n,m)\right\} \cdot e^{j2\pi K(N+G)}$$
$$= \tilde{\alpha} \cdot e^{j2\pi K(N+G)}$$

$$\hat{\varepsilon}_F = \frac{1}{2\pi K(N+G)} \angle \tilde{z} \qquad 3.7$$

Wherein $\tilde{\alpha}$ is a related channel response with a magnitude effect, N is the block size of each DMRS symbol, G is the length of CP, K is the number of symbols, and m is the index of the nth symbol.

The estimated initial fractional CFO, such as $\varepsilon_F$, can be used to compensate the received signal according to Equation 3.8.

$$\bar{y} = \phi^*(\hat{\varepsilon}_F)\Psi^*(\hat{\varepsilon}_F)y \qquad 3.8$$

wherein $\bar{y}$ is the received signal with the integral CFO after the received signal has been compensated for the fractional CFO, and wherein $\varepsilon_I$ can be expressed as $\varepsilon_I = \varepsilon - \varepsilon_F$.

The received signal without the initial fractional CFO can be rewritten as Equation 3.9:

$$\bar{y} = \Psi(\varepsilon_I)\{\tilde{h}_1^* \otimes (\tilde{u} + d1) + \tilde{h}_2 \otimes (\tilde{u}^* + d^*1)\} \qquad 3.9$$

wherein $\tilde{h}_1 = \phi(\varepsilon_I)h_1$ and $\tilde{h}_2 = \phi(\varepsilon_I)h_2$.

The other CFO compensation architecture is involved with the estimation of the initial integral CFO. Similarly, a DMRS training sequence is used to estimate the initial integral CFO. According to Equation 3.9, the received signal can be derived into Equation 3.10:

$$\bar{y} = \Psi(\varepsilon_I)\{\tilde{h}_1 \otimes \tilde{c} + \tilde{h}_2 \otimes \tilde{c}^* + \tilde{h}_1 \otimes d1 + \tilde{h}_2 \otimes d^*1\} \qquad 3.10$$
$$= \Psi(\varepsilon_I)\{C\tilde{h}_1 + C^*\tilde{h}_2 + dD\tilde{h}_1 + d^*D\tilde{h}_2\}$$

Wherein $\varepsilon_I$ is few candidate integral CFOs within the maximum CFO region. $\varepsilon_I$ can be expressed by Equation 3.11:

$$\varepsilon_I = I \cdot \Delta\varepsilon \qquad 3.11$$

wherein $$\Delta\varepsilon = \left(\frac{1}{2\pi K(N+G)T_s} \times \pi\right) / \frac{1}{NT_s} = \frac{N}{2K(N+G)} \qquad 3.12$$

$$\lceil -\varepsilon_{max,CFO}/\Delta\varepsilon \rceil < I < \lceil \varepsilon_{max,CFO}/\Delta\varepsilon \rceil \qquad 3.13$$

wherein $\varepsilon_{max,CFO}$ denotes the maximum CFO value.

The values of K, N and G in Equation 3.12 are known, $\Delta\varepsilon$ can be obtained. Therefore, the integral CFO ($\varepsilon_I$) is acquired.

With the known integral CFO, IQ DC offset can be removed with the frequency-domain estimation method that has been described in Part II. The post-FFT received signal can be obtained according to Equation 3.14:

$$\bar{y}_f = F\bar{y} \qquad 3.14$$
$$= F\Psi(\varepsilon_I)\tilde{C}\tilde{h}_1 + F\Psi(\varepsilon_I)\tilde{C}^*\tilde{h}_2 +$$
$$dF\Psi(\varepsilon_I)DF^H F\tilde{h}_1 + d^*F\Psi(\varepsilon_I)DF^H F\tilde{h}_2$$

wherein the definitions of the parameters are the same as those mentioned above. In other words, Equation 3.14 equals Equation 2.7 multiplied by the integral CFO. $\Psi_f(\varepsilon_I)$ can be expressed as Equation 3.15:

$$\Psi_f(\varepsilon_I) = F\Psi(\varepsilon_I)DF^H \qquad 3.15$$
$$= F\Psi(\varepsilon_I)F^H FDF^H$$
$$= \begin{bmatrix} \tilde{\lambda}_1 & & \\ & \tilde{\lambda}_2 & O \\ & & \vdots \end{bmatrix}$$
$$= [\bar{\psi}_{f,I} \mid O_{N \times (N-1)}]$$

wherein $FDF^H = \text{diag}\{\lambda_{DC}, 0, 0, \ldots\}$, and wherein $\bar{\psi}_{f,I}$ is the first column vector that denotes the IQ DC offset with a CFO effect, and wherein $\Psi_f$ is a rectangular matrix with the first column vector being non-zero and the other columns being zero. $\bar{\psi}_{f,I}$ can be removed, which means that the IQ DC offset with the integral CFO effect is eliminated.

In the same way to remove IQ DC offset as Equation 2.9, the post-FFT received data is multiplied by a matrix $T_I$ to remove the first column vector which is the IQ DC offset with the Ith integral CFO effect according to Equation 3.16.

$$\bar{y}_{f,I} = T_I F\bar{y} \qquad 3.16$$
$$= F_{T,I}\Psi(\varepsilon_I)\tilde{C}\tilde{h}_1 + F_{T,I}\Psi(\varepsilon_I)\tilde{C}^*\tilde{h}_2 + dT_I \Psi_f(\varepsilon_I)F\tilde{h}_1 +$$
$$d^* T_I \Psi_f(\varepsilon_I)F\tilde{h}_2$$

wherein the parameters in Equation 3.16 are respectively defined by Equations 3.17-3.20:

$$F_{T,I} = T_I F \qquad 3.17$$

$$T_I = I - \psi_{f,I}\psi^*_{f,I} \qquad 3.18$$

$$\psi_{f,I} = \overline{\psi}_{f,I}/\text{norm}(\overline{\psi}_{f,I}) \quad 3.19$$

$$T_I \overline{\Psi}_f(\epsilon_I) = O_{N \times N} \quad 3.20$$

$O_{N \times N}$ is an N by N matrix of all zeros, which indicates that IQ DC offset has been removed in Equation 3.19. $\epsilon_I$ is a predefined candidate integral CFO. Thus, $\overline{\psi}_{f,I}$ can be obtained beforehand. As the IQ DC offset effect caused by the integral CFO transferred to another subcarrier wave, the position of the two largest magnitudes of $\overline{\psi}_{f,I}$ can be monitored. Then, a $T_I$ blocking matrix is constructed to eliminate the influence of IQ DC offset, which will favor the search of the integral CFO. The $T_I$ matrix is dependent on the largest indices of $\overline{\psi}_{f,I}$ magnitudes. In different conditions, $T_I$ is respectively expressed by Equations 3.21-3.23:

$$T_I = [O_{(N-2) \times 2} \vdots I_{(N-2) \times (N-2)}]_{(N-2) \times N} \quad 3.21$$

for the first two largest subcarriers;

$$T_I = [I_{(N-2) \times (N-2)} \vdots O_{(N-2) \times 2}]_{(N-2) \times N} \quad 3.22$$

for the last two largest subcarriers; and $$T_I = [O_{(N-2) \times 1} \vdots I_{(N-2) \times (N-2)} \vdots O_{(N-2) \times 1}]_{(N-2) \times 2} \quad 3.23$$

for the first and the last largest subcarriers.

In order to find the correct Ith candidate integral CFO for removing IQ DC offset, the frequency-domain received signal can be expressed by Equation 3.24:

$$\overline{y}_{f,I} = F_{T,I} \Psi(\epsilon_I) \tilde{C} \tilde{h}_1 + F_{T,I} \Psi(\epsilon_I) \tilde{C}^* \tilde{h}_2 \quad 3.24$$
$$= \tilde{\tilde{C}}_I \tilde{h}$$

wherein $$\tilde{\tilde{C}}_I = [F_{T,I} \Psi(\epsilon_I) \tilde{C} \quad F_{T,I} \Psi(\epsilon_I) \tilde{C}^*] \quad 3.25$$

$$\tilde{h} = [\tilde{h}_1^T \quad \tilde{h}_2^T]^T \quad 3.26$$

wherein $\tilde{\tilde{C}}_I$ is a composite training sequence, and wherein $F_{T,I} \overline{C}_I = \tilde{\tilde{C}}_I$ and $\overline{C}_I = \Psi(\epsilon_I)[\tilde{C}\tilde{C}^*]$.

The composite response $\tilde{h}$ can be estimated with an LS method according to Equation 3.27:

$$\hat{\tilde{h}} = \tilde{\tilde{C}}_I^\dagger \overline{y}_{f,I} \quad 3.27$$
$$= \left(\tilde{\tilde{C}}_I^H \tilde{\tilde{C}}_I\right)^{-1} \tilde{\tilde{C}}_I^H \overline{y}_{f,I}$$

Next, $\hat{\tilde{h}}$ is substituted into $\overline{y}_{f,I}$ to obtain the projected received signal $\hat{\overline{y}}_{f,I}$ expressed by Equation 3.28:

$$\hat{\overline{y}}_{f,I} = \underbrace{\tilde{\tilde{C}}_I \left(\tilde{\tilde{C}}_I^H \tilde{\tilde{C}}_I\right)^{-1} \tilde{\tilde{C}}_I^H}_{\text{Projection}} \overline{y}_{f,I} \quad 3.28$$

In order to find the correct I, i.e. $\epsilon_I$, the error distance between the post-FFT received signal $\overline{y}_{f,I}$ and the projected received signal $\hat{\overline{y}}_{f,I}$ is minimized according to Equation 3.29.

$$\min_I \|\overline{y}_{f,I} - \hat{\overline{y}}_{f,I}\|^2 = \min_I \left\|\overline{y}_{f,I} - \tilde{\tilde{C}}_I\left(\tilde{\tilde{C}}_I^H \tilde{\tilde{C}}_I\right)^{-1} \tilde{\tilde{C}}_I^H \overline{y}_{f,I}\right\|^2 \quad 3.29$$

-continued
$$= \min_I \overline{y}_{f,I}^H \left[I - \tilde{\tilde{C}}_I\left(\tilde{\tilde{C}}_I^H \tilde{\tilde{C}}_I\right)^{-1} \tilde{\tilde{C}}_I^H\right] \overline{y}_{f,I}$$
$$= \max_I \overline{y}_{f,I}^H \tilde{\tilde{C}}_I\left(\tilde{\tilde{C}}_I^H \tilde{\tilde{C}}_I\right)^{-1} \tilde{\tilde{C}}_I^H \overline{y}_{f,I}$$

According to the abovementioned algorithm, the integral CFO can be determined via finding the maximum of Equation 3.30:

$$\hat{\epsilon}_I = \arg \max_I \overline{y}^H F_{T,I}^H F_{T,I} \overline{C}_I (\overline{C}_I^H F_{T,I}^H F_{T,I} \overline{C}_I)^{-1} \overline{C}_I^H F_{T,I}^H F_{T,I} \overline{y} \quad 3.30$$

wherein $\overline{y}$ is the original received signal with the initial fractional CFO compensation, $F_{T,I}$ is a transform matrix with IQ DC offset removal, $\overline{C}_I$ is the known training sequence matrix with candidate integral CFO rotation.

The present invention further provides another method to undertake integral CFO searching, wherein the integral CFO is found via nulling the DC component and searching the projection of the residual power of IQ DC offset. According to Equation 3.29, the integral CFO can be determined with the abovementioned algorithm. However, nulling the transform $T_I$ is to remove the DC component, which will transform or deform the other subcarrier waves. Therefore, the minimization ML scheme cannot find the correct integral CFO in the output power of all the subcarrier waves. In order to overcome the problem, the present invention proposes a minimization ML scheme, which is adaptive to specified DC subcarrier output power and expressed by Equation 3.31. The nulling transforms are for different integral CFOs. If the nulling transform matches the integral CFO of the received DC component signal, the minimum output power of the DC carrier wave can be acquired, and the correct integral CFO can be found.

$$\epsilon_I = \arg \min_{\epsilon_I} e_m^H \{\text{diag}(\overline{y}_{f,I}^H) \quad 3.31$$
$$\left[I - \tilde{\tilde{C}}_I\left(\tilde{\tilde{C}}_I^H \tilde{\tilde{C}}_I\right)^{-1} \tilde{\tilde{C}}_I^H\right] \text{diag}(\overline{y}_{f,I})\} e_m$$
$$= \arg \min_{\epsilon_I} e_m^H \{\text{diag}(\overline{y}^H F_{T,I}^H)$$
$$[I - F_{T,I} \overline{C}_I (\overline{C}_I^H F_{T,I}^H F_{T,I} \overline{C}_I)^{-1} \overline{C}_I^H F_{T,I}^H] \text{diag}(F_{T,I} \overline{y})\} e_m$$

wherein $e_m = [0, 0, \ldots, 0, 1, 0, \ldots, 0, 0]^T$ with the mth element being assigned 1, and wherein m is the DC carrier index due to the DC component being shifted by the integral CFO. Because the candidate integral CFO has been predefined, the definitions of $\overline{y}$ and $F_{T,I}$ are the same as in Equation 3.30. The index m can be predetermined by the largest magnitude component of the IQ DC offset vector $\overline{\psi}_{f,I}$ as shown in Equation 3.32.

$$m = \arg \max_m |\overline{\psi}_{f,I}(m)|, 0 \leq m \leq N - 1 \quad 3.32$$

After the integral CFO is estimated, the complete CFO is acquired, such as $\hat{\epsilon} = \hat{\epsilon}_F + \hat{\epsilon}_I$. Then, the received signal can be compensated with $\hat{\epsilon}$ according to Equation 3.33:

$$\bar{y} = \phi^*(\hat{\varepsilon})\Psi^*(\hat{\varepsilon})y \quad 3.33$$

$$\approx \tilde{h}_1 \otimes (\tilde{u}+d1) + \tilde{h}_2 \otimes (\tilde{u}^* + d^*1)$$

wherein the initial phases are merged into $h_1$ and $h_2$ according to Equation 3.34:

$$\tilde{h}_1 = e^{j\Theta}h_1$$

$$\tilde{h}_2 = e^{j\Theta}h_2 \quad 3.34$$

Assuming the CFO compensation is perfect, the received signal only has IQ imbalance, shaping filter imbalance, multipath channel, and IQ DC offset (i.e. Equation 3.33). Then, the estimation and compensation method of Part II can be used herein, and the original transmitted signal ($\hat{u}$) will be checked.

If CFO is not estimated perfectly, partial decision-directed symbols ii can be used to undertake better estimation ($\Delta\hat{\varepsilon}$) of CFO and other imperfection parameters according to Equation 3.35 and Equation 3.36:

$$\bar{z} = \sum_{n=K+1}^{K+Q} (\hat{s}^H(n)\bar{y}(n))^*(\hat{s}^H(n+Q)\bar{y}(n+Q)) \quad 3.35$$

$$= \bar{\alpha}e^{j2\pi\Delta\varepsilon Q(M+G)}$$

$$\Delta\hat{\varepsilon} = \frac{1}{2\pi Q(M+G)}\angle\bar{z} \quad 3.36$$

wherein Q denotes the size of the related block symbol of the current symbol block, and wherein $\bar{\alpha}$ denotes the related channel response with a magnitude of time-invariant environment, and wherein $\hat{s}$ is the reconstructed decision-directed symbol expressed by Equation 3.37.

$$\hat{s} = \hat{\tilde{h}}_1 \otimes (\hat{\tilde{u}}+d1) + \hat{\tilde{h}}_2 \otimes (\hat{\tilde{u}}^*+\hat{d}^*1) \quad 3.37$$

If the performance of EVM (Error Vector Magnitude) is not good enough, the present invention may further use the reconstructed decision-directed symbols ($\hat{s}$) to estimate and compensate RF imperfections until the performance of EVM converges.

Similarly, the present invention may also use the frequency-domain equalizer to reduce the computational complexity. Herein, the entire RF imperfections and channel environment is taken into consideration, as shown in FIG. 2. The RF imperfections and channel environment will be estimated and compensated step by step. After CFO compensation, the residual problem can be solved in the way as in Part II. In other words, the abovementioned method can be used to estimate and compensate the residual RF imperfections easily.

After Equation 3.33, the process will return to Equation 2.1 and continue to use the estimation and compensation method of Part II to equalize the received signal. Then, the original demodulation data is estimated similarly to Equations 1.19-1.31, which have been demonstrated above and will not repeat herein.

As shown in the flowchart of FIG. 2, the joint estimation and compensation method of the present invention sequentially solves the problems of CFO, DC offset, multipath channel, IQ imbalance and shaping filter imbalance so as to remove the influence of IQ mismatches caused by the direction-conversion transceiver and effectively estimate and compensate RF mismatches in an LTE uplink system.

The present invention can further take different RF decays into consideration and undertake the joint estimation and compensation of the RF decays in the time domain. Thereby, the present invention improves the performance of the LTE uplink system furthermore.

Figure 3:
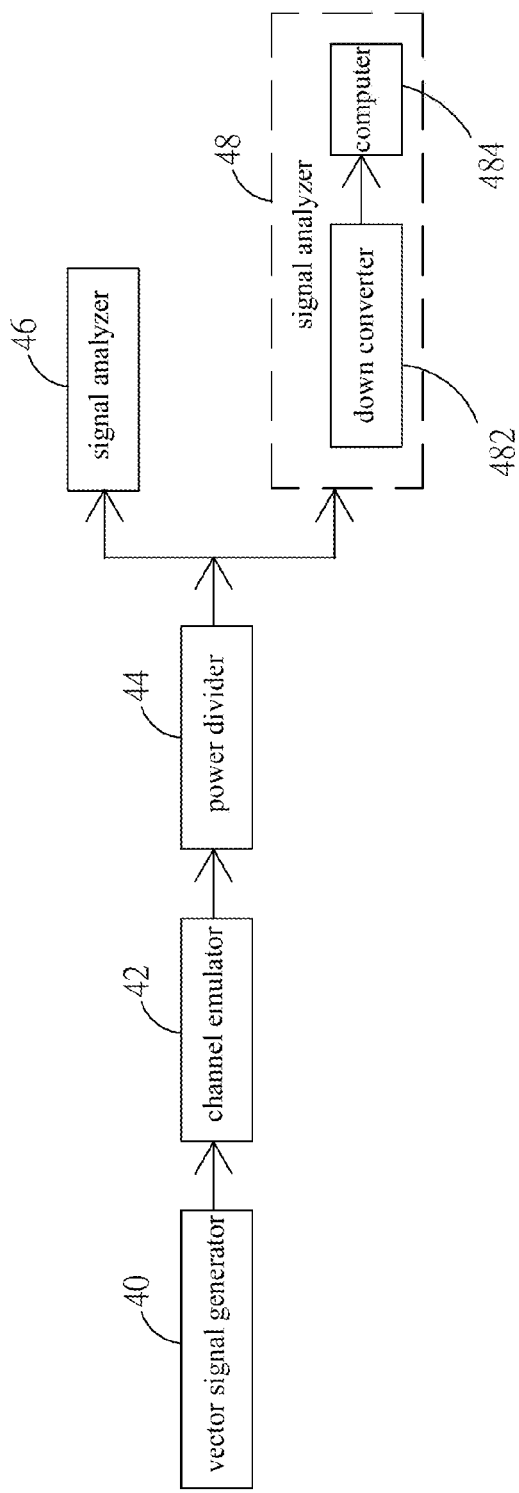
FIG. 3 is a diagram schematically showing an LTE signal analysis system according to the prior art.

After the technical contents and efficacies of the present invention are fully demonstrated above, the results of the present invention will be compared with the results of the LTE signal analyzer 46 of an international company Rohde & Schwarz (R&S), as shown in FIG. 3. The LTE signal analyzer 48 used by the present invention includes a down converter 482 (which may be an AGILENT E4406A) and a computer 484. Firstly, use an R&S vector signal generator (VSG) 40 to transmit a standard uplink signal. A channel emulator 42 is used to generate a multipath channel. The signal is respectively transmitted by a power divider 44 to the R&S LTE signal analyzer 46 and the LTE signal analyzer 48 of the present invention for performance comparison.

Next, the VSG 40 is used to set RF imperfection parameters, including I-channel DC offset: 10%, Q-channel DC offset: −5.1%, magnitude imbalance: 1 dB, phase imbalance: 10 degrees, and central carrier frequency: 1.85001 GHz so as to generate 10 KHz CFO. The channel emulator 42 is set to meet the ITU standard: time lags: 0, 110, 190, and 410 ns; average powers of the paths: 0, −9.7, −19.2, and −22.8 dB.

Figure 4B:
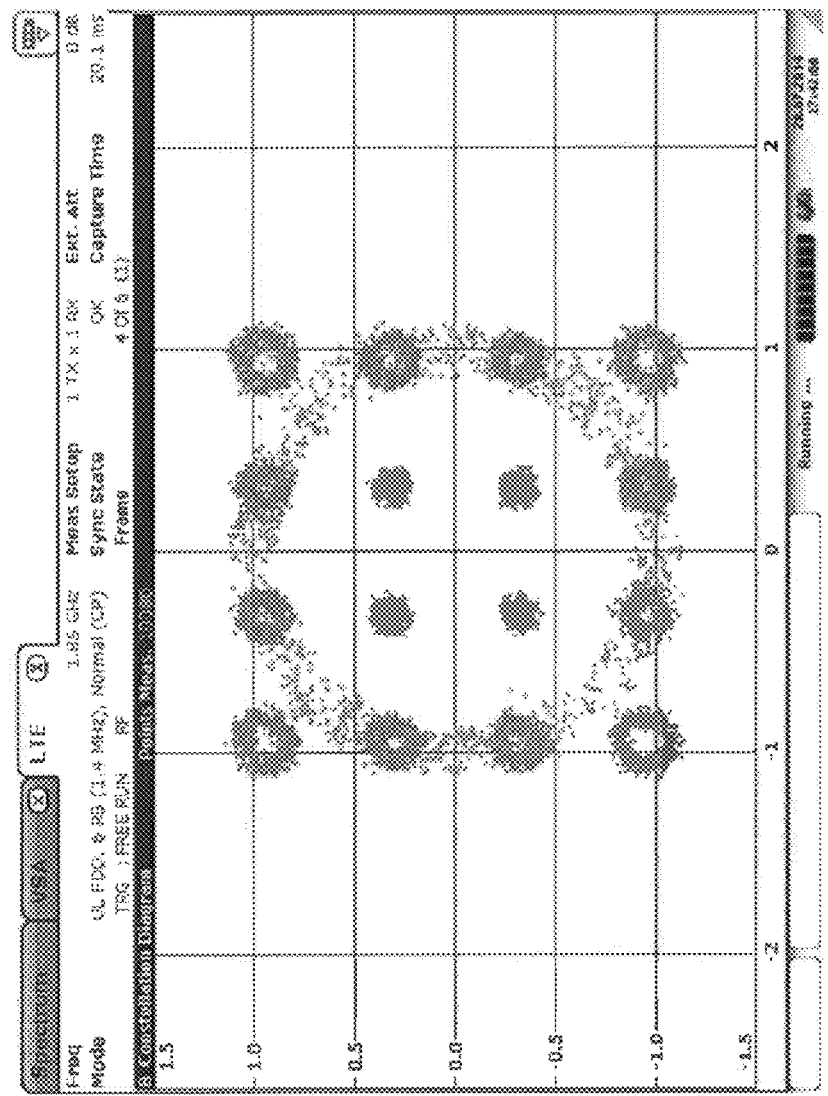
FIG. 4(b) shows a constellation map of the performance analysis results of an R&S LTE signal analyzer.
Figure 5A:
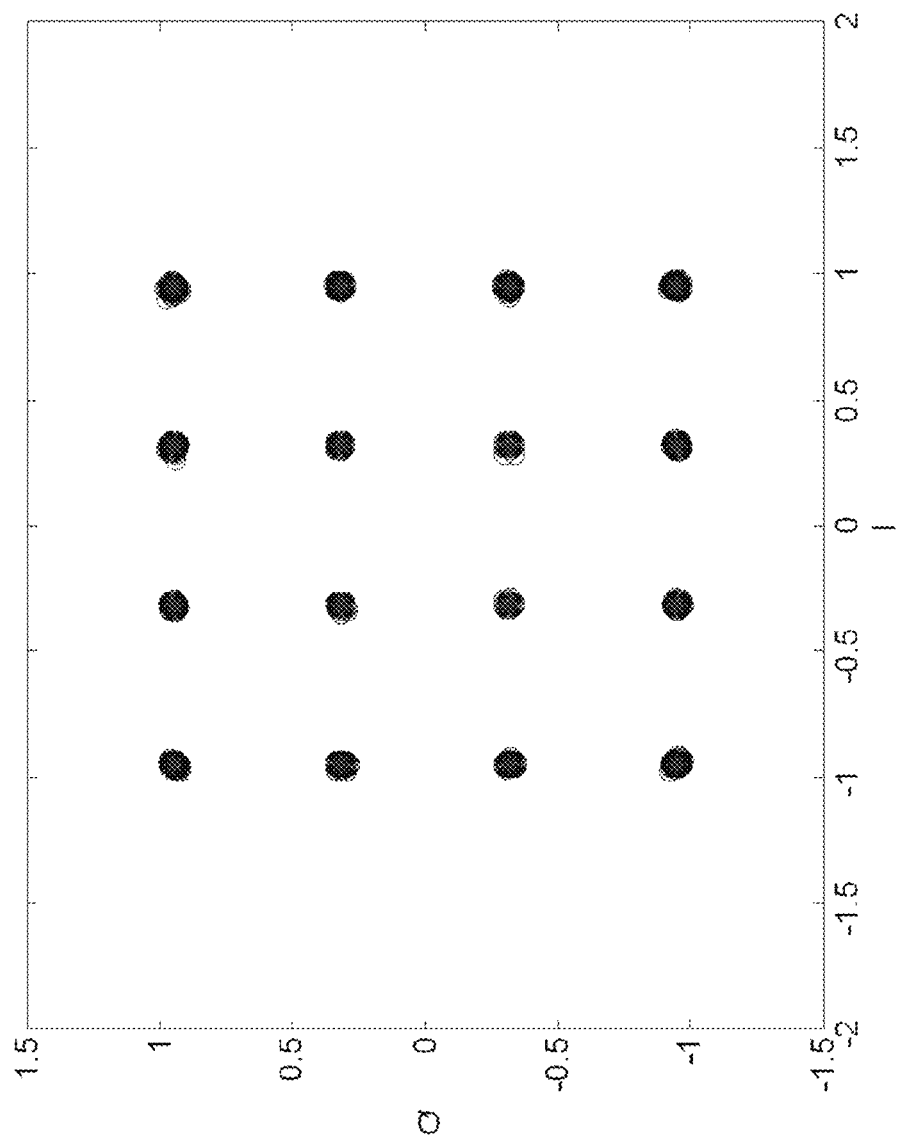
FIG. 5(a) shows a constellation map of PUSCH signals, wherein RF imperfections have been compensated by the present invention.
Figure 5B:
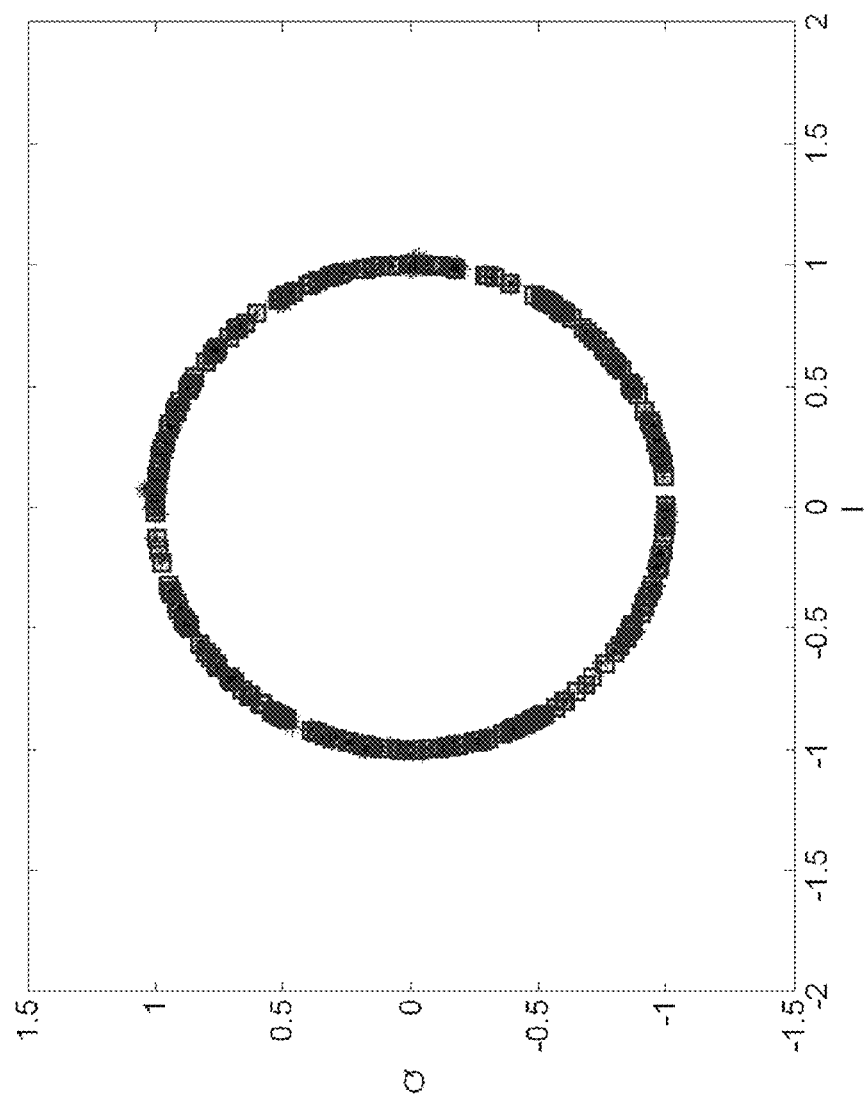
FIG. 5(b) shows a constellation map of DMRS signals, wherein RF imperfections have been compensated by the present invention.
Figure 6:
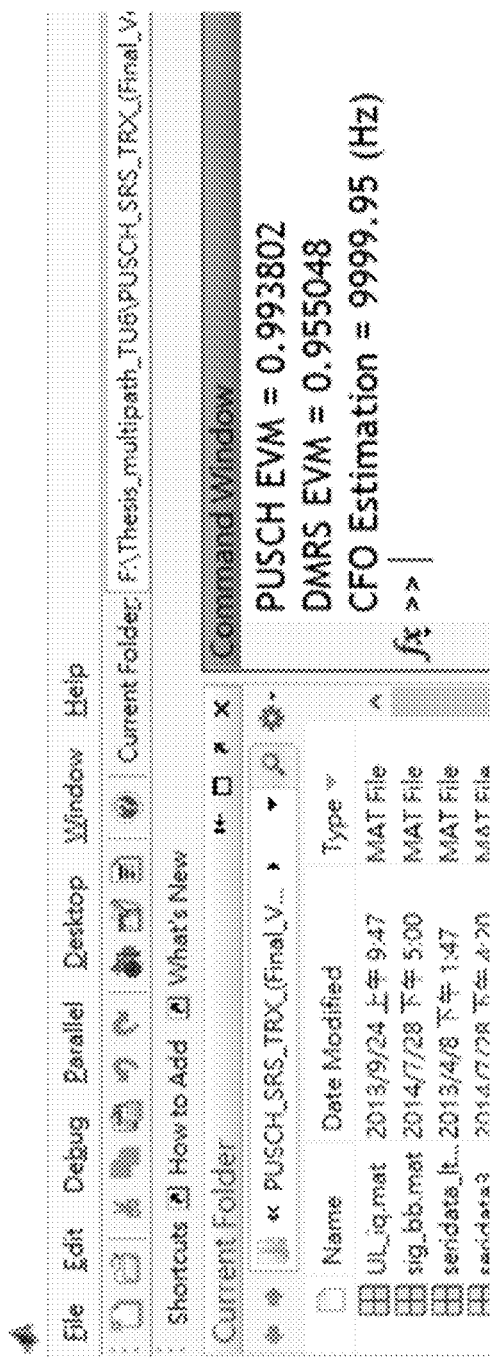
FIG. 6 shows a captured image of EVM performance of PUSCH signals and DMRS signals of the present invention.

The analysis of the measurement results of the R&S LTE signal analyzer 46 is shown in FIG. 4(*a*) and FIG. 4(*b*), which are respectively EVM (Error Vector Magnitude) and the constellation map of the performance analysis results of the R&S LTE signal analyzer 46. Owing to RF imperfections and multipath channel, the EVM performance decline is as much as 10%. Contrarily, the joint estimation and compensation method of the present invention still has a superior performance of only 1% EVM, as shown in FIG. 5(*a*), FIG. 5(*b*), and FIG. 6. FIG. 5(*a*) and FIG. 5(*b*) respectively show the constellation maps of PUSCH signals and DMRS signals of the present invention. FIG. 6 shows the captured image of EVM performance of PUSCH signals and DMRS signals of the present invention. Thus is proved that the joint estimation and compensation method of the present invention not only meets the LTE standard but also has superior signal reception quality in adverse environments.

The technical contents and characteristics of the present invention have been fully demonstrated with the embodiments to enable the persons skilled in the art to understand, make, and use the present invention hereinbefore. However, these embodiments are only to exemplify the present invention but not to limit the scope of the present invention. Any equivalent modification or variation according to the spirit of the present invention is to be also included within the scope of the present invention.

What is claimed is:

1. A joint estimation and compensation method of RF imperfections in a LTE uplink system, comprising steps:
   establishing a joint signal model with RF imperfections;
   according to said joint signal model, undertaking an initial CFO (Carrier Frequency Offset) estimation of a received signal in a time domain so as to estimate CFO parameters and compensate said received signal;
   undertaking a joint estimation of direct-current (DC) offset, multipath channel and imbalance signals of said joint signal model of said received signal, compensating said received signal in said time domain, and acquiring imbalance parameters of said imbalance signals;

determining modulation data to acquire an original transmitted signal;

determining whether error vector magnitude converges:

if yes, estimating gain mismatch parameters and phase mismatch parameters of said joint signal model according to said imbalance parameters; and if no, using a decision-directed symbol to undertake iterative CFO estimation and compensation so as to undertake further estimation and compensation of said Imperfections until said error vector magnitude converges; and estimating gain mismatch parameters and phase mismatch parameters of said joint signal model according to said imbalance parameters.

2. The joint estimation and compensation method according to claim 1, wherein said initial CFO estimation includes steps:

using a training sequence to estimate an initial fractional CFO so as to compensate said received signal;

estimating an initial integral CFO so as to acquire a value of said initial integral CFO; and using a frequency estimation method to remove said CFO of said received signal.

3. The joint estimation and compensation method according to claim 2, wherein said joint signal of said received signal is expressed by $$y = \phi(\varepsilon)\Psi(\varepsilon)\tilde{y}$$
$$= \Psi(\varepsilon)\{\tilde{h}_1 \otimes (\tilde{u} + d1) + \tilde{h}_2 \otimes (\tilde{u}^* + d^*1)\}, \text{ and}$$

wherein $$\phi(\varepsilon) = e^{j(2\pi\varepsilon(N+G)\frac{n}{N}+\theta)}, \Psi(\varepsilon) = \text{diag}\{1, e^{j2\pi\varepsilon\frac{1}{N}}, \ldots, e^{j2\pi\varepsilon\frac{(N-1)}{N}}\},$$

and $h_1$ and $h_2$ are multiplied by $\phi(\epsilon)$ to obtain $$\tilde{h}_1 = \phi(\varepsilon)h_1$$
$$\tilde{h}_2 = \phi(\varepsilon)h_2$$

and wherein $\theta$ is an initial phase, and $\epsilon$ is a normalized CFO, and wherein N is a block size of a DMRS (demodulation reference signal) symbol, G is a length of cyclic prefixes, and N=0, 1, . . . N−1.

4. The joint estimation and compensation method according to claim 2, wherein said frequency estimation method converts said received signal into a post-FFT (Fast Fourier Transform) received signal and then removes said CFO from said post-FFT received signal.

5. The joint estimation and compensation method according to claim 2, wherein in said step of estimating said initial integral CFO, said integral CFO is determined via finding a maximum of $$\hat{\varepsilon}_I = \arg\max_I \bar{y}^H F_{T,I}^H F_{T,I} \bar{C}_I (\bar{C}_I^H F_{T,I}^H F_{T,I} \bar{C}_I)^{-1} \bar{C}_I^H F_{T,I}^H F_{T,I} \bar{y},$$

wherein $\bar{y}$ is an original received signal with initial fractional CFO being compensation, $F_{T,I}$ a transform matrix with DC offset removal, $\bar{C}_I$ is a known training sequence matrix with a candidate integral CFO.

6. The joint estimation and compensation method according to claim 2, wherein said integral CFO is estimated via nulling a DC component and searching a projection of residual power of said DC offset.

7. The joint estimation and compensation method according to claim 1, wherein partial decision-directed symbols are used to undertake said iterative CFO estimation.

8. The joint estimation and compensation method according to claim 7, wherein said iterative CFO estimation is undertaken according to following equations:

$$z = \sum_{n=K+1}^{K+Q} (\hat{s}^H(n)\bar{y}(n))^* (\hat{s}^H(n+Q)\bar{y}(n+Q))$$
$$= \bar{\alpha}e^{j2\pi\Delta\varepsilon Q(M+G)}$$

$$\Delta\hat{\varepsilon} = \frac{1}{2\pi Q(M+G)} \angle z, \text{ and}$$

wherein Q is dependent on a size of a related block symbol of a current symbol block, and wherein $\bar{\alpha}$ is a related channel response, and wherein $\hat{s}$ is said decision-directed symbol.

9. The joint estimation and compensation method according to claim 8, wherein said decision-directed symbol $\hat{s}$ is expressed by $\hat{s}=\hat{h}_1 \otimes (\hat{\tilde{u}}+\hat{d}1)+\hat{h}_2 \otimes (\hat{\tilde{u}}^*+\hat{d}^*1)$, wherein $h_1$ and $h_2$ are imbalance parameters, u is an estimated original signal, and d is an estimated DC offset.

10. The joint estimation and compensation method according to claim 1, wherein said joint signal model of said received signal y with CFO compensation is expressed by $y=h_1 \otimes (\tilde{u}+d1)+h_2 \otimes (\tilde{u}^*+d^*1)$, wherein $h_1$ and $h_2$ are imbalance coefficients involving IQ imbalance and shaping filter imbalance, and wherein d denotes DC offset, and Vector I is all N×1 vectors, and wherein $h_1$ and $h_2$ involve a real part and an imaginary part a filter imbalance parameter $h_{C,I}$ and $h_{C,Q}$, and wherein $h_{C,I}$ and $h_{C,Q}$ are convoluted with multipath channel $h_{ch}$ and expressed by $$\begin{cases} h_{C,I} = \text{Re}\{h_{RX}\} \otimes \text{Re}\{h_{ch} \otimes h_{TX}\} \\ h_{C,Q} = \text{Im}\{h_{RX}\} \otimes \text{Im}\{h_{ch} \otimes h_{TX}\} \end{cases},$$

and wherein $h_{RX}$ and $h_{TX}$ are respectively shaping filters of a transmitter and a receiver.

11. The joint estimation and compensation method according to claim 10, wherein said DC offset and said multipath channel are estimated with a demodulation reference signal (DMRS), and wherein said received signal is expressed by a convolution matrix:

$$y = h_1 \otimes \tilde{c} + h_2 \otimes \tilde{c}^* + h_1 \otimes d1 + h_2 \otimes d^*1$$
$$= \tilde{C}\tilde{h}_1 + \tilde{C}^*\tilde{h}_2 + dDh_1 + d^*Dh_2,$$

wherein D is a circular convolution matrix of all 1 vectors, and wherein $\tilde{C}$ is an N by L+1 circular convolution matrix generated by a training sequence $\tilde{c}$ with $\Delta f=\frac{1}{2}$ offset, and wherein $\tilde{h}_1=\text{diag}\{e_0, e_{-1}, \ldots, e_{-L}\}h_1$ and $\tilde{h}_2=\text{diag}\{e_0^*, e_{-1}^*, \ldots, e_{-L}^*\}h_2$.

12. The joint estimation and compensation method according to claim 11, wherein said step of using said training sequence to estimate said DC offset and said multipath channel of said joint signal model of said received signal further includes steps:
converting said received signal into a post-FFT received signal in a frequency-domain;
multiplying said post-FFT received signal with a zero matrix to eliminate said DC offset and acquire said received signal in said frequency-domain;
using a least square and a feedback cancellation technique to estimate a reconstructed DC offset signal; and
subtracting said reconstructed DC offset signal from said received signal to obtain a residual expressed by $y = h_1 \otimes \tilde{u} + h_2 \otimes \tilde{u}^*$.

13. The joint estimation and compensation method according to claim 1, wherein said imbalance signals include an IQ imbalance signal and a shaping filter imbalance signal.

14. The joint estimation and compensation method according to claim 13, wherein said received signal with said CFO, said DC offset, said multipath channel having been estimated and compensated is said joint signal model with imbalance signals, which is expressed by $y = h_1 \otimes \tilde{u} + h_2 \otimes \tilde{u}^*$, and wherein $h_1$ and $h_2$ are said imbalance parameters with IQ imbalance and shaping filter imbalance, and wherein $\tilde{u}$ is an original signal with $\Delta f = \frac{1}{2}$.

15. The joint estimation and compensation method according to claim 14, wherein a demodulation reference signal is used as said training sequence and expressed by $$\tilde{C} = E \begin{bmatrix} c(0) & c(N-1) & \cdots & c(1) \\ c(1) & c(0) & \cdots & c(2) \\ \vdots & \vdots & \ddots & \vdots \\ c(N-1) & c(N-2) & \cdots & c(0) \end{bmatrix}_{N \times L},$$

wherein $E = \text{diag}\{e_0, e_1, \ldots, e_{N-1}\}$ is a diagonal matrix with $\Delta f = \frac{1}{2}$ offset, and wherein $\tilde{c} = [\tilde{c}(0)\ \tilde{c}(1) \ldots \tilde{c}(N-1)]$ is a Chu sequence with a length of N and $\Delta f = \frac{1}{2}$.

16. The joint estimation and compensation method according to claim 15, wherein a pseudo inverse matrix is used to estimate said imbalance parameters of said imbalance signals.

17. The joint estimation and compensation method according to claim 14, wherein said gain mismatch parameter $g_T$ and said phase mismatch parameter $\phi_T$ are estimated via using imbalance parameters of IQ imbalance and shaping filter imbalance of $h_1$ and $h_2$ according to an equation:

$$\begin{cases} h_1 = \frac{1}{2}(h_{C,I} + h_{C,Q} g_T e^{j\phi_T}) \\ h_2 = \frac{1}{2}(h_{C,I} + h_{C,Q} g_T e^{j\phi_T}) \end{cases},$$

and wherein $h_{C,I}$ and $h_{C,Q}$ are respectively a real-part shaping filter imbalance parameter and an imaginary-part shaping filter imbalance parameter.

18. The joint estimation and compensation method according to claim 17, wherein a frequency-domain equalizer is used to equalize said received signal and reduce computational complexity.

19. The joint estimation and compensation method according to claim 18, wherein equalizing said received signal includes steps: using a known matrix to compensate $\Delta f = \frac{1}{2}$ offset of aid received signal; converting said received signal in a time domain into a frequency-domain received signal; using said imbalance parameters to obtain a $\Delta f = \frac{1}{2}$ offset involving matrix of joint estimation of said IQ imbalance parameter and said shaping filter imbalance parameter and a joint RF effect parameter; and multiplying said frequency-domain received signal with an inverse matrix coefficient to remove said joint RF effect parameter so as to complete an equalization process and obtain an original frequency-domain transmitted signal.

20. The joint estimation and compensation method according to claim 19, wherein after said original frequency-domain transmitted signal is obtained, an IFFT operator is used to convert said original frequency-domain transmitted signal into an original time-domain transmitted signal.

* * * * *